United States Patent
Cheung et al.

(10) Patent No.: US 7,065,669 B2
(45) Date of Patent: Jun. 20, 2006

(54) SYSTEM AND METHOD FOR PROVIDING A WRITE STROBE SIGNAL TO A RECEIVING ELEMENT BEFORE BOTH AN ADDRESS AND DATA SIGNAL

(75) Inventors: Hugo Cheung, Tucson, AZ (US); Lu Yuan, Carlsbad, CA (US); Terence Chiu, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 356 days.

(21) Appl. No.: 10/139,737

(22) Filed: May 6, 2002

(65) Prior Publication Data

US 2002/0166076 A1 Nov. 7, 2002

Related U.S. Application Data

(60) Provisional application No. 60/289,010, filed on May 4, 2001.

(51) Int. Cl.
*G06F 1/04* (2006.01)
*G06F 13/00* (2006.01)

(52) U.S. Cl. ...................... 713/600; 711/100
(58) Field of Classification Search ............... 713/400, 713/600; 711/100
See application file for complete search history.

(56) References Cited

U.S. PATENT DOCUMENTS

| | | | | |
|---|---|---|---|---|
| 4,241,416 A | * | 12/1980 | Tarczy-Hornoch | 714/47 |
| 5,694,586 A | * | 12/1997 | Eneboe | 713/401 |
| 6,091,515 A | * | 7/2000 | Kimura | 358/434 |
| 6,134,516 A | * | 10/2000 | Wang et al. | 703/27 |
| 6,247,137 B1 | * | 6/2001 | Wickeraad | 713/401 |
| 6,629,222 B1 | * | 9/2003 | Jeddeloh | 711/167 |
| 6,651,225 B1 | * | 11/2003 | Lin et al. | 716/4 |

* cited by examiner

*Primary Examiner*—Thomas Lee
*Assistant Examiner*—Mark Connolly
(74) *Attorney, Agent, or Firm*—W. James Brady, III; Frederick J. Telecky, Jr.

(57) ABSTRACT

A method and apparatus is provided for that includes an improved special function register (SFR) access scheme by using a clock tree distribution process. In accordance with an exemplary embodiment, a conditional SFR write strobe signal may be used to trigger the SFR registers. A clock tree distribution process may be used to achieve significantly higher system speed. When balancing the clock network of the system, the clock leaf of the flip-flop or other circuit element that generates the SFR write strobe signal may be "advanced" by connecting the circuit element directly to the clock root. In addition, the SFR write strobe signal distribution may be balanced as a separate clock tree with minimum insertion delay.

15 Claims, 3 Drawing Sheets

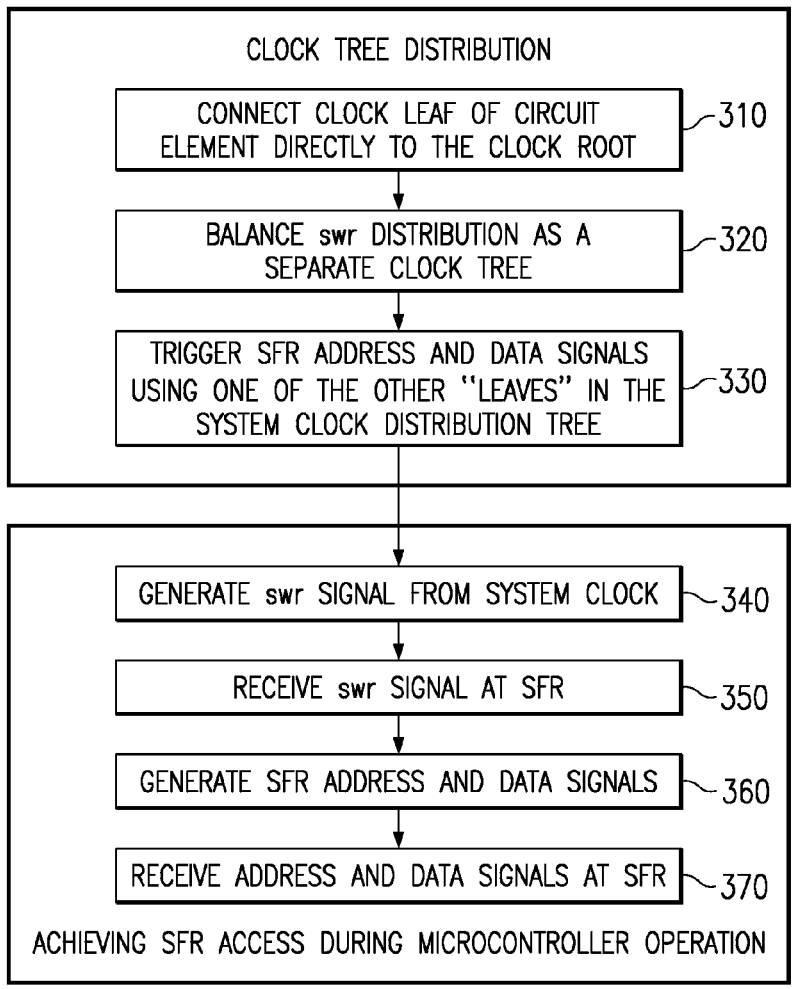
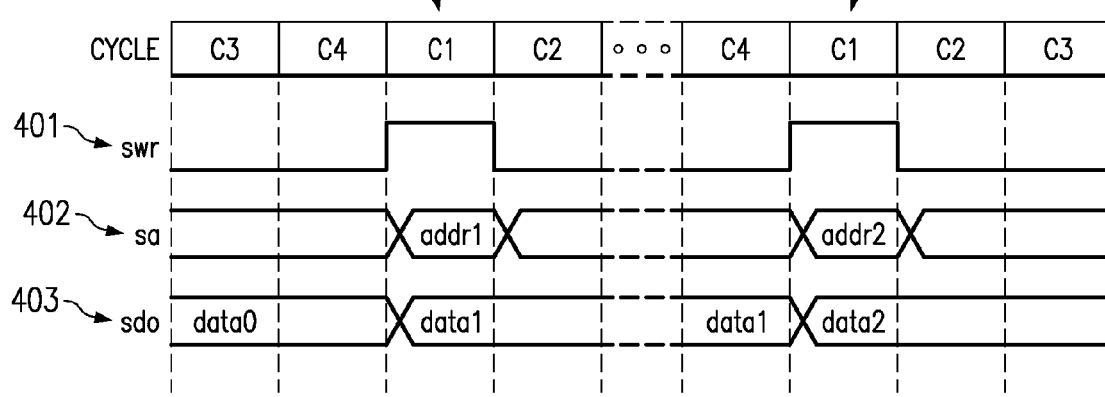

SYSTEM AND METHOD FOR PROVIDING A WRITE STROBE SIGNAL TO A RECEIVING ELEMENT BEFORE BOTH AN ADDRESS AND DATA SIGNAL

CROSS-REFERENCE TO RELATED APPLICATIONS

This application claims priority to, and the benefit of, U.S. Provisional Patent Application Ser. No. 60/289,010, entitled "METHOD AND DEVICE FOR PROVIDING NON-INTERRUPT REGISTER ACCESS" and filed on May 4, 2001, which is hereby incorporated by reference in its entirety.

TECHNICAL FIELD

The present invention relates to electronic circuits.

BACKGROUND INFORMATION

The demand for higher performance, microcontroller-based products for use in communication and processing applications continues to increase rapidly. As a result, microcontroller-based product manufacturers are requiring the components and devices within these products to be continually improved to meet the design requirements of a myriad of emerging audio, video and imaging applications.

These microcontroller-based products use various types of processors, for example, general purpose microprocessors for controlling the logic of various digital devices, such as clock radios, microwave ovens, digital video recorders and the like, and special purpose microprocessors, such as math coprocessors for mathematical computations, or digital signal processors used in manipulating various types of information, including sound, imaging and video information. The microcontroller system typically includes a central processing unit (CPU) core for the processing functions, and a bus interface for communication with various memory devices as well as external or other peripheral devices. For the storage of data, the microcontroller system can include various types of memory. For example, the CPU for the microcontroller may include Random Access Memory (RAM) as well as Read-Only Memory (ROM), i.e., programmed memory. In addition, the microcontroller can also include flash memory which can be erased and preprogrammed in blocks instead of being programmed one byte at a time.

For the transmitting and receiving of data between various devices and components, microprocessors and other devices utilize various types of serial interfaces. One such type of interface is the serial peripheral interface (SPI). In addition, for the temporary storage of data, for example to permit the microprocessors to manipulate the data before transferring the data through the SPI to another device, the microprocessors generally utilize one or more buffers. These buffers are integrated with the SPI's to enable the processors to transmit and receive data to and from the buffers as needed in an application.

In embedded microcontroller systems, multiple peripheral devices can be accessed by the microprocessor through a special function register (SFR) bus. Accesses to these SFRs are typically triggered by clock signals. A peripheral can be shut down by stopping the peripheral's clock, however, which causes the SFRs that reside in that peripheral to be inaccessible during the shut down period. Thus, to access the SFRs at any time, a free running clock is required which provides the trigger signals to the SFR. However, in many systems, such as in lower power applications, a free running clock is not provided due to the high power consumption of the free running clock.

Some approaches to reduce power consumption have attempted to use a non-clock signal as a trigger signal. However, these solutions require delay logic so that the SFR address and data buses remain valid while the SFR is reactivated. The delay logic is undesirable as it adds complexity and slowness to the system. Moreover, if the SFR access is in the critical path of a system, delaying the availability of the address and data may require slowing down the system clock frequency.

SUMMARY OF THE INVENTION

In accordance with various aspects of the present invention, an improved special function register (SFR) access scheme is provided using clock tree distribution techniques. In accordance with an exemplary embodiment, a conditional SFR signal may be used to trigger the SFRs.

In accordance with another aspect of the present invention, clock tree distribution techniques may be used to achieve significantly higher system speed. When balancing the clock network of the system, the clock leaf of the flip-flop or other circuit element that generates the SFR write strobe signal may be "advanced." The clock leaf of the SFR write strobe signal generating circuit element (e.g., the flip-flop) may be "advanced" by connecting the circuit element directly to the clock root. In addition, the SFR write strobe signal distribution may be balanced as a separate clock tree with minimum insertion delay.

BRIEF DESCRIPTION OF THE DRAWINGS

A more complete understanding of the present invention may be derived by referring to the detailed description when considered in connection with the figures, where like reference numbers refer to similar elements throughout the figures, and:

FIG. 3 illustrates a flow diagram in accordance with an exemplary method of the present invention;

FIG. 4 illustrates a timing diagram of an exemplary write access operation in accordance with an exemplary embodiment of the present invention;

DETAILED DESCRIPTION OF EXEMPLARY EMBODIMENTS

The present invention may be described in terms of various functional components and various processing steps. Such functional components may be realized by any number of hardware or structural components configured to perform the specified functions. For example, the present invention may employ various integrated components, e.g., buffers, storage devices, peripheral devices, memory components, and the like, comprised of various electrical devices, e.g., resistors, transistors, capacitors, diodes, logic elements, or other devices, whose values and characteristics may be suitably configured for various intended purposes. In addition, the present invention may be practiced in any data writing application. Such general applications are not described in detail herein. However for purposes of illustration only, exemplary embodiments of the present invention are described in connection with a microcontroller.

Further, while various components may be suitably coupled or connected to other components within exemplary circuits, such connections and couplings can often be realized by direct connection between components, or by connection through other components and devices. To understand the various operational sequences of the present invention, an exemplary description is provided. However, the following example is for illustration purposes only and the present invention is not limited to the embodiments disclosed.

Figure 5:
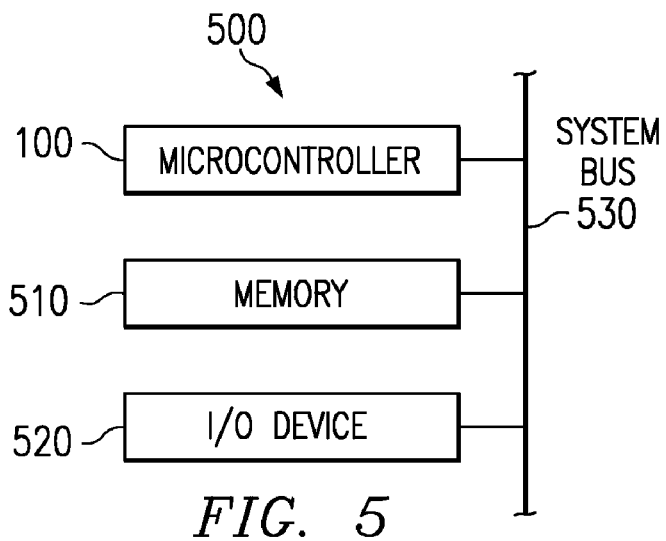
FIG. 5 illustrates a block diagram of an exemplary electronic system in accordance with an exemplary embodiment of the present invention.

In the context of the present invention, an electronic system may comprise any system that accesses another component. For example, point-of-sale terminals, analog-to-digital converters, and home appliances are all examples of such electronic systems. With reference to FIG. 5, an electronic system 500 suitably includes a microcontroller 100, memory 510, and I/O device 520. The microcontroller, memory, and I/O device may be attached to a system bus 530 that allows the microcontroller to access the memory and I/O device. Alternatively, the microcontroller may be directly connected to the memory and I/O device.

Memory 510 may suitably comprise any type of electronic device used for storing data including random access memory (RAM), hard drives, removable hard drives, read only memory (ROM), flash memory, and the like. I/O device 520 may comprise any component used to provide an input/output interface to the system such as printers, keypads, disks, mice, scanners, displays, and the like.

Figure 1:
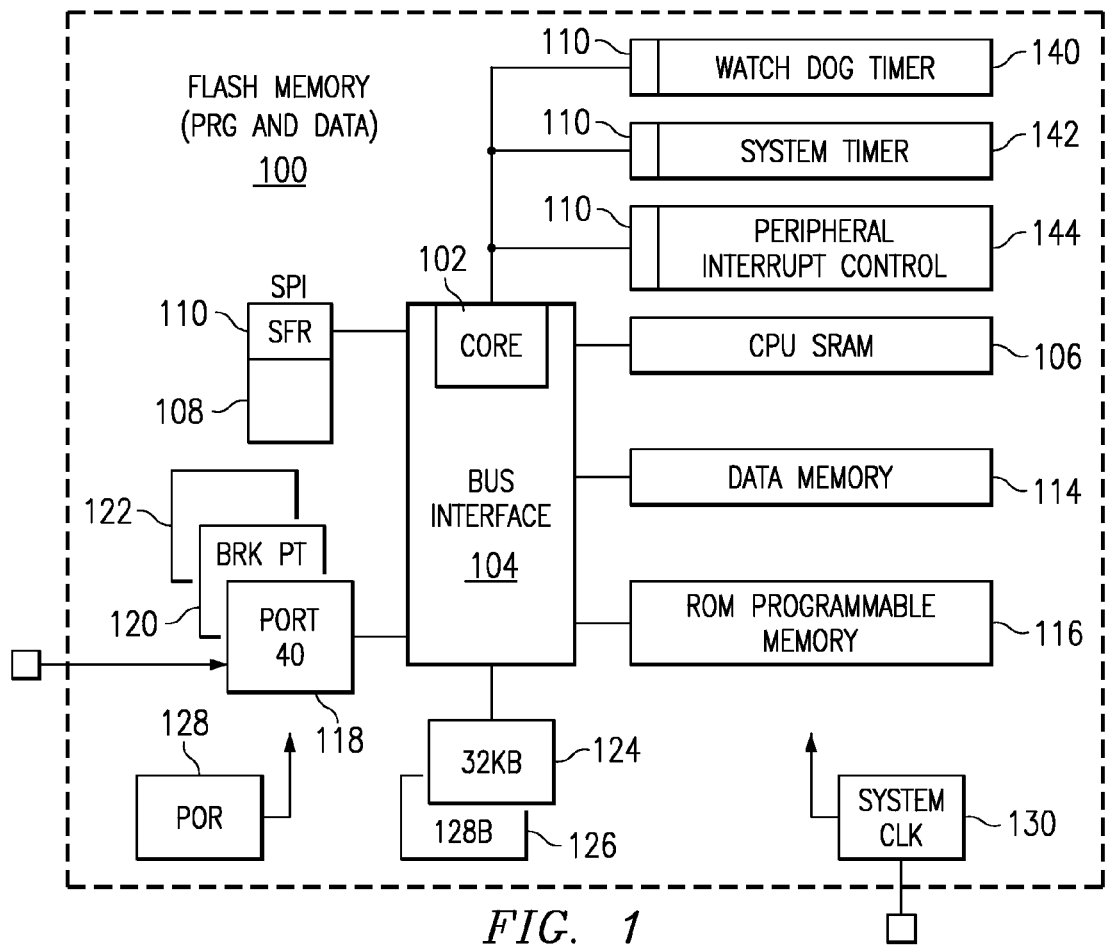
FIG. 1 illustrates a block diagram of an exemplary microcontroller in accordance with an exemplary embodiment of the present invention.

Microcontroller 100 may include a large variety of components. Microcontroller components may include a central processing unit ("CPU") in communication with memory devices, input/output devices, peripheral devices, and other typical microcontroller components. With reference to FIG. 1, an exemplary microcontroller 100 is illustrated. However, the exemplary embodiments of the present invention may be suitably implemented in any appropriate configuration. Microcontroller 100 suitably comprises a CPU core 102 configured for the processing of data, and a bus interface 104 for communication with the various memory or input and output devices.

For the storage of data, microcontroller 100 can also comprise various types of memory. For example, microcontroller 100 can comprise an internal CPU memory 106 which can be implemented using static random access memory (SRAM) and the like which can provide low access time. In addition, microcontroller 100 can also include data memory 114 which can also comprise, for example, SRAM-type memory. Microcontroller 100 can also include, for example, read-only memory (ROM) 116, which can comprise the programmable memory for the microcontroller 100. Still further, microcontroller 100 can also include flash memory for the programming and storage of data, such as a large page of memory 124 comprising, for example, 32 KB of data storage, as well as a smaller configuration of flash memory 126, comprising, for example, 128 Bytes.

Microcontroller 100 can also comprise serial peripheral interface (SPI) 108 for transmitting and receiving data between various components. SPI 108 can communicate with the CPU memory 106 via direct memory access (DMA), i.e., SPI 108 can transfer data from memory components and a device without passing the data through the CPU.

Microcontroller 100 can also include input/output devices. For example, an I/O port device 118, 122 can be provided, as well as a breakpoint device 120. Further, microcontroller 100 can also include a system clock 130 for providing clock cycles for triggering various functions and sequences during operation. Microcontroller 100 can also include a Power On Reset (POR) 128 for use during ramping up of a power supply.

Microcontroller 100 can also include peripheral devices. For example, peripheral devices might include watchdog timer 140, system timer 142, or peripheral interrupt controller 144. Other peripheral devices may be connected, and the present invention is not limited to any particular type of peripheral device. In the present microcontroller, the CPU core 102 communicates with memory and peripheral devices through bus IF 104. The CPU core 102 selects the memory location or the device with which the CPU core 102 wants to communicate, and either reads or writes data/instructions to or from that memory location or device via the bus IF 104. The data/instructions are provided to components, such as the peripheral devices 140, 142, 144 via special function registers (SFR) 110 that reside in the peripheral device.

In accordance with one aspect of the present invention, an apparatus and a method, methods or combination of steps is provided which utilizes a conditional SFR write strobe signal to trigger the SFR registers to receive data/instructions. One advantage of this method is that the peripheral's clock is not needed as the peripheral clock signal is not used. Thus, if the peripheral's clock is shut down during block level shut down, the method and apparatus can still provide access to the peripheral's SFRs.

In accordance with another aspect of the present invention, the method and apparatus avoids the timing difficulties associated with using a non-clock signal, such as the SFR write strobe signal, by using a clock tree distribution process to achieve higher system speed.

Various signal techniques can be used to access a peripheral device via an SFR, such as using conventional write, address, and data signals. In an exemplary embodiment, the write signal is identified as "swr", address signal as "sa", and data out from the CPU as "sdo". With reference to FIG. 4, an exemplary timing diagram of a write operation is illustrated. CPU core 102 may be configured to perform the write access operation. A CPU instruction cycle can be divided up into various divisions. For example, a CPU instruction cycle can be divided into four divisions C1, C2, C3, and C4. Alternatively, more or less divisions can be used. In accordance with an exemplary embodiment, a swr write signal 401 is provided by the CPU during a C1 clock phase 410. Also, during the C1 clock phase 410, the address and output data signals 402, 403 are provided and may be suitably latched with the falling edge of the swr write signal 401 at the end of the C1 clock cycle 410. The address and data are held by bus IF 104 for a certain period of time after the swr write signal goes high to ensure that the data is properly written to the selected SFR register 110.

Figure 2:
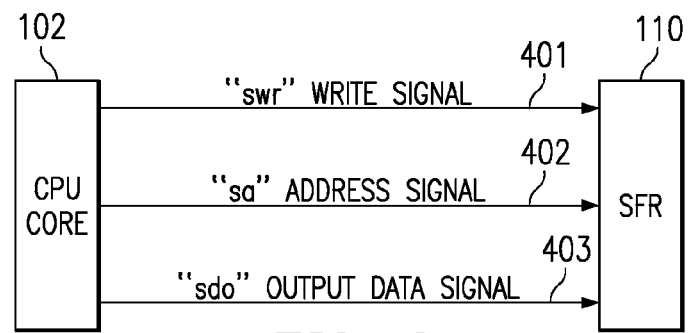
FIG. 2 illustrates a data flow diagram in accordance with an exemplary embodiment of the present invention.

With reference to FIG. 2, an exemplary data flow diagram of a write operation is illustrated. In accordance with an exemplary embodiment, when the microcontroller writes data to a SFR register 110, "swr" write signal 401 is suitably generated by the microcontroller from system clock 130 to indicate a write operation. Next, the address "sa" and output data "sdo" signals 402, 403 are provided such that the swr write signal 401 arrives at SFR register 110 earlier than sa address signal 402 and sdo output data signal 403 to ensure that the data is available when the SFR register tries to access the data from the bus IF.

Figure 6:
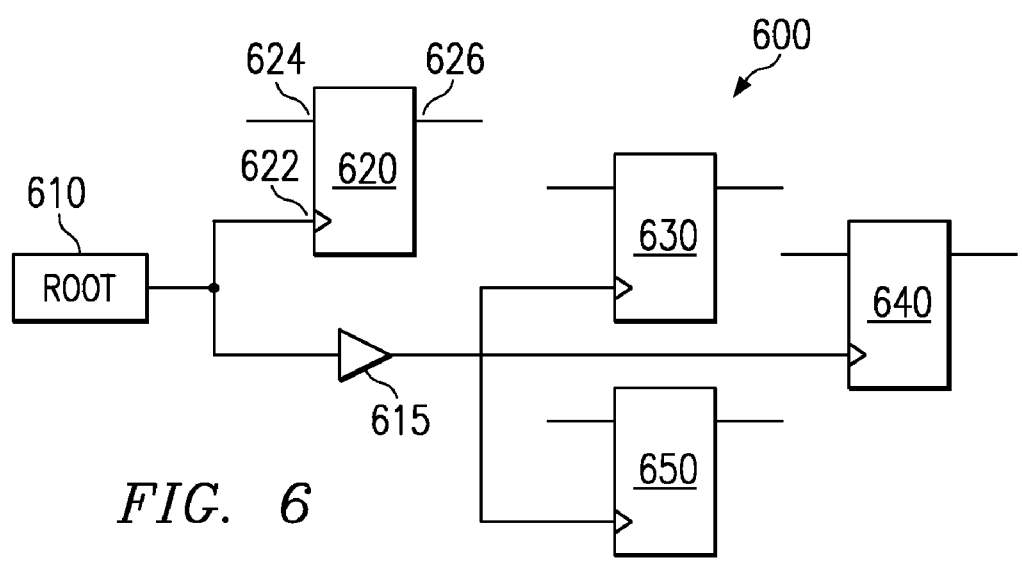
FIG. 6 illustrates a clock tree in accordance with an exemplary embodiment of the present invention.

With reference to FIG. 6, an exemplary clock tree 600 for generating the swr write signal 401 is illustrated. Clock tree 600 includes a root 610, a clock buffer 615, and leaves 620, 630, 640, and 650 that may be flip-flops or other circuit elements. In accordance with an exemplary embodiment, a flip-flop, such as flip-flop 620, may be used to generate the write signal. Flip-flop 620 includes a clock input 622, an input 624, and an output 626. The clock input 622 of flip-flop 620 may be directly connected to clock root 610 of the clock tree.

The flip-flop or other circuit element that generates the swr signal may be configured to provide enough setup time for the address and data signals. For example, a clock tree balance EDA tool, such as the CT-Gen tool from Cadence Design Systems, may be used to balance the clock network. When using the clock tree balance tool or other similar tool, the clock leaf of the flip-flop or other circuit element that generates the SFR write strobe signal may be "advanced" such that insertion delays normally experienced by leaves of the clock tree are avoided. The other leaves of the clock network tree may have a longer insertion delay and a minimum skew associated with those leaves. The clock leaf of the SFR write strobe signal generating circuit element (e.g., the flip-flop) may be "advanced" by connecting the circuit element directly to the clock root. By connecting the clock leaf of the flip flop directly to the clock root, delay and clock skew caused by intermediate components between the clock root and the clock leaf can be avoided. In addition, the SFR write strobe signal distribution may be balanced as a separate clock tree with minimum insertion delay. In accordance with this exemplary embodiment, the SFR write strobe signal arrives at the SFR before the SFR address and data signals, as the SFR address and data signals are triggered by one of the leaves in the system clock distribution tree which have a certain insertion delay and clock skew.

In accordance with another aspect of the present invention, the SFR access can be achieved at a low power consumption. For example, compared to the system clock, the SFR write strobe signal has a lower frequency and is only active when the selected SFR is being accessed. In addition, in accordance with the present invention, SFR access may be obtained without the use of the peripheral clock. For example, instead of using the peripheral clock to signal the SFR to provide data, the conditional SFR write strobe signal may be used to trigger the SFR registers to provide data. This reduces the power consumption required for SFR access as there is no need to supply power to the peripheral clock to initiate the access.

In accordance with another aspect of the present invention, as the SFR data and address buses are not slowed down, the system may run at maximum speed even when the SFR access is in the critical path of the system. For example, in accordance with various aspects of the present invention, there is no need to delay access to the SFR to ensure that the SFR data and address buses are properly synchronized to the write strobe signal.

The apparatus and methods of the present invention may be implemented in a number of ways, however, in accordance with an exemplary embodiment, and with reference to FIG. 3, a method 300 for writing to a SFR register during shutdown of the peripheral device associated with the SFR register uses clock tree distribution. In this exemplary embodiment, a clock tree distribution is first performed during design and generation of the clock tree for the microcontroller system. This is followed by the system, when in operation, writing to the SFR registers utilizing a non-clock write strobe signal without any delay logic for the sa address and sdo data out signals. The clock tree distribution technique may be performed by utilizing a clock tree tool such as the CT-Gen tool from Cadence Design Systems.

For example, still referring to FIG. 3, in a step 310, during design and generation of the clock tree, the clock leaf of the flip flop device or other circuit element used to generate the swr write signal may be advanced. For example, the clock leaf may be advanced by connecting the clock leaf directly to the system clock root. One advantage of advancing the clock leaf that generates the swr write signal is that the inherent insertion delays and clock skew of the other leaves of the clock tree are avoided.

In addition, in a step 320, the generation of the swr write signal may be balanced as a separate clock tree with minimum insertion delay.

Next, in a step 330, the triggering of the sa address signal and the sdo data out signal may be assigned to one of the other leaves (i.e., leaf that does not generate swr write signal) in the system clock distribution tree. In this manner, the clock tree distribution technique provides for a swr write signal that arrives at the appropriate SFR register before the associated sa address and sdo data out signals.

In accordance with another aspect of the present invention, continuous access to the SFR registers of the peripheral devices may be obtained even during block level shut down of the block where the peripheral device may reside. Block level shut down may be desired particularly for low power applications as shutting down the block saves power. During operation of the microcontroller, in a step 340, the microcontroller generates a swr signal from the system clock. In this manner, use of a free running clock with a high power consumption is avoided.

Next, the swr signal is received by the SFR (step 350) which may then prepare for the sa address and sdo data out signals. In a step 360, the sa and sdo signals are generated after the swr signal without the need for any extra delay logic. This is accomplished by use of the clock tree distribution described above. This allows for the system to run at its maximum speed when SFR access is in the critical path as there is no need to delay the sa address or sdo data out signals. In a step 370, the sa address and sdo data out signals are received by the SFR after the swr write signal has been received. In this manner, the address and data have enough setup time to be properly written to the SFR.

As discussed above, previous attempts for providing constant access to peripheral devices and their associated SFRs have resulted in solutions that require high power consumption free running clocks or solutions that provide low speed access to SFRs due to delays introduced so that the SFRs' addresses and data are synchronized. However, in accordance with various aspects of the present invention, an improved high performance method and apparatus is provided that requires low power during operation and allows the system to operate at maximum system speed. In accordance with an exemplary embodiment, clock tree distribution techniques are utilized to achieve non-interrupt SFR access during block level shut down of a peripheral.

The present invention has been described above with reference to an exemplary embodiment. However, changes and modifications may be made to the exemplary embodiment without departing from the scope of the present invention. For example, the various components may be implemented in alternate ways, such as varying or alternating the steps in different orders. These alternatives can be suitably selected depending upon the particular application or in consideration of any number of factors associated with the operation of the system. In addition, the techniques described herein may be extended or modified for use with other types of devices, in addition to the microprocessor or to any other master or slave devices. These and other changes or modifications are intended to be included within the scope of the present invention.

What is claimed is:

1. An electronic system comprising:
a receiving element; and
a microcontroller connected to the receiving element, wherein the microcontroller comprises:
a system clock;
a CPU core configured to generate a write strobe signal, an address signal, and a data signal without the use of any delay logic based on a clock distribution tree; and
wherein the write strobe signal is provided to the receiving element a selected time before the address signal and the data signal.

2. The electronic system according to claim 1, wherein the receiving element is shut down.

3. The electronic system according to claim 1, wherein the CPU core is further configured to generate the write strobe signal inside the microcontroller from the system clock.

4. The electronic system according to claim 1, wherein the receiving element comprises a special function register configured to receive the write strobe signal, the address signal, and the data signal.

5. An electronic system comprising:
a receiving element; and
a microcontroller connected to the receiving element, wherein the microcontroller comprises:
a system clock:
a CPU core configured to generate a write strobe signal, an address signal, and a data signal without the use of any delay logic; and
wherein the write strobe signal is provided to the receiving element a selected time before the address signal and the data signal,
wherein the microcontroller has a system clock distribution tree generated by performing a clock tree distribution process, wherein the clock tree distribution process comprises:
advancing the generation of the write strobe signal; and
assigning the generation of the address signal and the data signal to one of a plurality of leaves of the system clock distribution tree.

6. The electronic system according to claim 5, wherein the clock tree distribution process further comprises balancing the generation of the write strobe signal as a separate clock tree.

7. The electronic system according to claim 5, wherein the system clock distribution tree includes a clock root and the step of advancing the generation of the write strobe signal comprises connecting a circuit element to the clock root, wherein the circuit element is configured to generate the write strobe signal.

8. A method of accessing a register of a peripheral device in a microcontroller system having a system clock distribution tree and a clock root, comprising:
performing a clock tree distribution process, wherein the clock tree distribution process comprises:
advancing the generation of a write strobe signal that is used to write data to the register of the peripheral device; and
assigning the generation of an address signal and a data out signal to one of a plurality of leaves of the system clock distribution tree; and
using the write strobe signal, the address signal, and the data out signal to access the register of the peripheral device.

9. The method of claim 8, further comprising balancing the generation of the write strobe signal as a separate clock tree.

10. The method of claim 9, wherein the step of balancing the generation of the write strobe signal comprises balancing the generation of the write strobe signal as a separate clock tree with a minimum insertion delay.

11. The method of claim 8, wherein the step of advancing the generation of a write strobe signal comprises connecting a clock leaf of a circuit element to the clock root, wherein the circuit element is configured to generate the write strobe signal.

12. The method of claim 8, wherein the step of using the write strobe signal, the address signal, and the data out signal, comprises:
generating the write strobe signal;
receiving, by the peripheral device, the write strobe signal;
generating the address signal, wherein the address signal corresponds to the register of the peripheral device;
generating the data signal, wherein the data signal corresponds to data; and
receiving, by the peripheral device, the address signal and the data signal after the write strobe signal has been received.

13. The method of claim 12, wherein the step of generating the write strobe signal comprises generating the write strobe signal inside the microcontroller from a system clock.

14. The method of claim 12, wherein the register comprises a special function register of the peripheral device.

15. The method of claim 12, wherein the peripheral device is shut down.

* * * * *